(12) United States Patent
Forrer et al.

(10) Patent No.: US 8,279,421 B2
(45) Date of Patent: Oct. 2, 2012

(54) OPTICAL-ELECTRONIC DISTANCE MEASURING DEVICE

(75) Inventors: Peter Forrer, Romanshorn (CH); Kurt Giger, Ruethi (CH)

(73) Assignee: Leica Geosystems AG, Heerbrugg (CH)

( * ) Notice: Subject to any disclaimer, the term of this patent is extended or adjusted under 35 U.S.C. 154(b) by 283 days.

(21) Appl. No.: 12/812,628

(22) PCT Filed: Feb. 3, 2009

(86) PCT No.: PCT/EP2009/051191
§ 371 (c)(1),
(2), (4) Date: Jul. 13, 2010

(87) PCT Pub. No.: WO2009/101002
PCT Pub. Date: Aug. 20, 2009

(65) Prior Publication Data
US 2010/0296078 A1    Nov. 25, 2010

(30) Foreign Application Priority Data
Feb. 11, 2008    (CH) ........................................ 0191/08

(51) Int. Cl.
*G01C 3/08*    (2006.01)
(52) U.S. Cl. ...................... 356/5.01; 356/5.02; 356/5.03; 356/5.1

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| 7,379,016 B1 * | 5/2008 | McEwan ...................... 342/134 |
| 2004/0135992 A1 | 7/2004 | Munro |

FOREIGN PATENT DOCUMENTS

| EP | 0738899 A1 | 10/1996 |
| WO | 02/16964 | 2/2002 |

* cited by examiner

*Primary Examiner* — Luke Ratcliffe
(74) *Attorney, Agent, or Firm* — Maschoff Gilmore & Israelsen

(57) ABSTRACT

The invention relates to an optical-electronic distance measuring method according to the phase measurement principle by emitting of optical measuring radiation, which is modulated according to the burst modulation principle, having a burst period duration made of an active burst time and a dead time, receiving at least a part of the measuring radiation (23), which is reflected on the measured object, wherein transforming into an input measuring signal (ES) is performed, and determining a distance to the measured object by analyzing a measuring signal (MS, gMS) generated from the input measuring signal (ES).

21 Claims, 5 Drawing Sheets

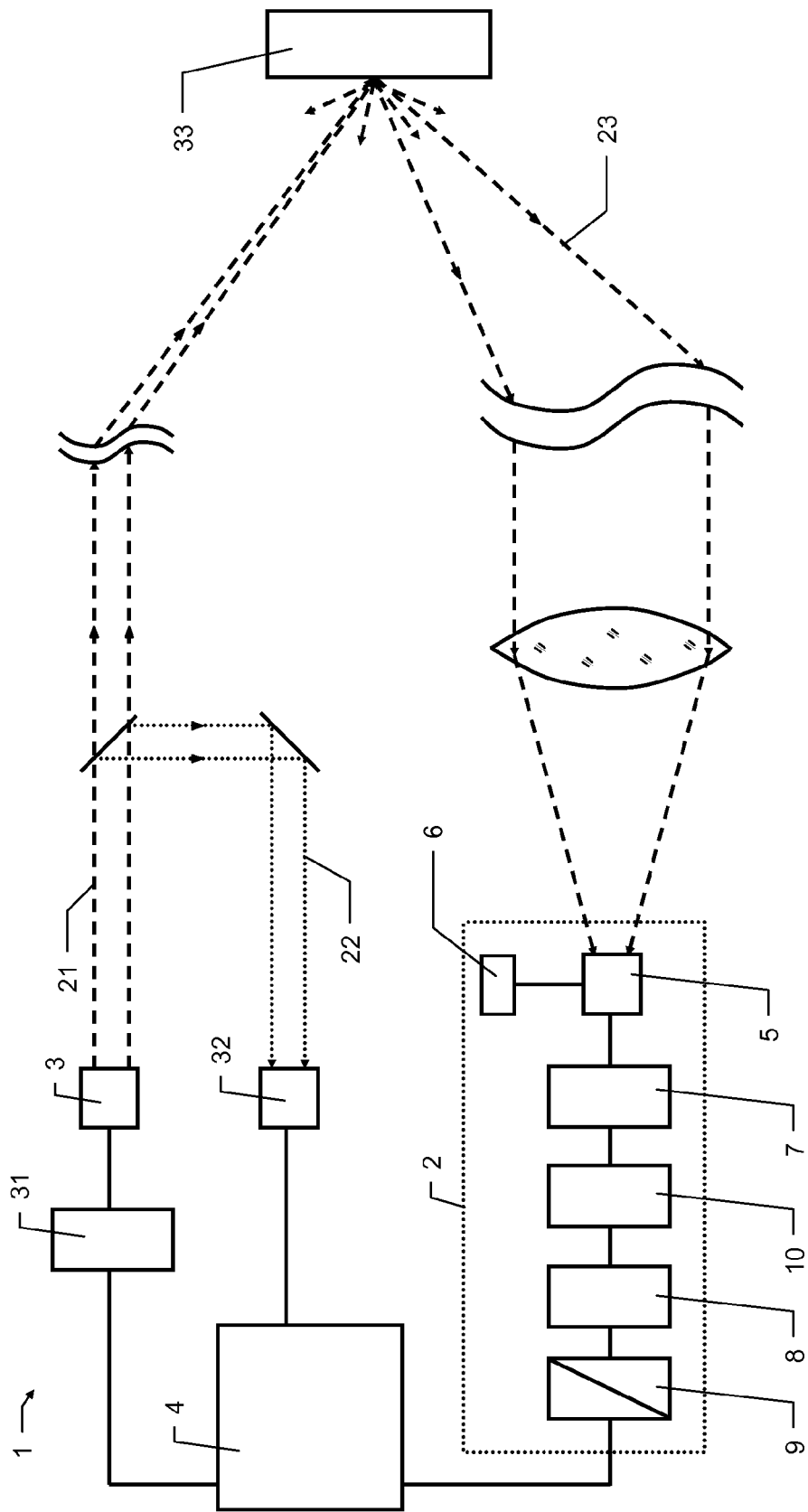

OPTICAL-ELECTRONIC DISTANCE MEASURING DEVICE

The invention relates to an optoelectronic distance measuring method, an optoelectronic distance measuring device and a receiving circuit for this purpose.

BACKGROUND

Optoelectronic distance measuring devices of the generic type are sufficiently well known from the prior art. They have a distance measuring range of a few tens of meters and are often in the form of hand-held devices. They are used mainly in construction surveying or in interior finishing, for example for three-dimensional surveying of rooms. Further fields of use for distance measuring devices are geodetic and industrial surveying. The basic principle of distance measurement with the known devices is based on the evaluation of a change, as a function of time, of a characteristic of the electromagnetic radiation emitted by the device and reflected by an object sighted. The distance measuring device is equipped for this purpose with a transmitter for emitting intensity-modulated radiation. Hand-held devices chiefly employ optical radiation in the visible wavelength spectrum in order to facilitate the sighting of the measuring points. The optical radiation is reflected by the measured object sighted and detected by a receiver installed in the device. The distance to the measured object is obtained from the time lag of the received radiation compared with the radiation emitted by the transmitter.

Pin photodiodes or avalanche photodiodes for transforming the received radiation reflected by the measured object into electrical signals are usually used as detectors in the known distance measuring devices. Distance measuring devices whose distance determination is based on the phase measurement principle are very common. In such devices, the electrical received signal is superposed directly on the avalanche photodiode or after preamplification with a mixer frequency to give a low-frequency measuring signal. On this low-frequency signal, the phase is determined and is compared with the phase of a reference signal. The difference between the measured phase of the low-frequency measuring signal and the phase of the reference signal is a measure of the distance to the measured object.

EP-B-0 738 899 describes the behaviour of laser diodes for visible radiation and the associated accuracy problems in distance measurement. For improving the accuracy of the distance measurement, it is proposed there to modulate the emitted laser radiation with pulse widths of less than 2 ns. The modulation frequency of this known device is in the region of about 50 MHz. In the case of pulses having a pulse width of, for example, 1 ns and a period of 20 ns, a pulse power of about 20 mW is required in the case of these known devices in order to achieve an average power of 1 mW which generally ensures sufficient visual certainty. The proposed type of modulation can also be implemented with commercially available 3 mW lasers without having to accept relatively great sacrifices in the lifetime of the laser owing to the increased pulse power compared with continuous 3 mW operation. As a result of the short pulses and the high pulse power, a short coherence length of the laser radiation is achieved. This results in a reduction of the generally granulated intensity distribution of the radiation reflected by the generally rough surface of the measured object sighted. The granulated intensity distribution is also known by the name speckles and influences the achievable accuracy of measurement.

WO 02/16964 describes a method and a device for distance measurement which are based on the phase measurement of optical measuring radiation reflected by a measured object sighted. Intensity-modulated, optical measuring radiation emitted by a measuring device is transmitted to the measured object and a part of the measuring radiation which is reflected by the measured object is detected by a receiver arranged in the measuring device and converted into electrical measuring signals. The electrical measuring signals are then compared with a reference signal which is generated from the detection and conversion of a measuring light component passed through a known reference distance, in order to determine the distance between the measuring device and the measured object from a phase difference. It is proposed to emit the measuring radiation with burst modulation and to evaluate the measuring signal of the receiver only during a timespan dependent on an active burst duration.

The active burst time is that duration during which a burst signal is present, whereas no signal is present at the laser diode as a transmitter during a dead time. The period of the sequence of bursts and dead time is referred to as burst period. The burst signal has a duty cycle which is defined as the ratio of the active burst time to the burst period in %. Thus, the burst modulation differs from a pulse modulation in which the modulation signal is present quasi-continuously over a total duration of a measuring period. In the case of burst modulation, on the other hand, the modulation signal is present only during a part of the measuring period, so that a pulse sequence is emitted only during the active burst time. According to the abovementioned definition, the duty cycle is always 100% in the case of pulse modulation while the value is always less than 100% in the case of burst modulation. The burst modulation can be effected, for example, by means of a burst signal with square-wave modulation.

By evaluating the measuring signal of the receiver only during the active burst duration, the signal/noise ratio (S/N) can be improved. This can be explained by a simplified example of a laser with a maximum average output power of 1 mW. If, instead of the measuring radiation with 2.5 mW peak power emitted in the case of the known devices, a laser burst of 10% duty cycle with a peak power of 25 mW is radiated, an average laser power of 1 mW is obtained again. Because the received signal is evaluated only during the active burst duration, the same total signal which would arise if a continuous signal were summed is obtained. However, since no evaluation takes place during 90% of the period, 90% of the noise may also be suppressed. In this simplified example, this results in an improvement of the signal/noise ratio (S/N) by a factor of $\sqrt{(10)}$, i.e. square root (10).

The burst modulation can be effected in principle with an active burst duration which is limited only to a single peak. Expediently, however, the active burst duration is chosen so that a duty cycle which is about 5% to about 50%, preferably about 10% to about 40%, results therefrom.

For the burst modulation effect, the emitted measuring radiation can be modulated in particular with a modulation frequency of greater than 100 MHz and a peak power greater than 10 mW. The higher peak powers of the laser in the case of burst modulation also shorten the coherence length of the emitted laser radiation since the laser jumps through several modes with the same pulse width but higher peak power. This can have an advantageous effect on the accuracy of the measuring devices.

Furthermore, the burst modulation may also lead to a simplification of the regulation of the laser power and permit a reduction of power consumption.

The distance measuring devices described in WO 02/16964 have a transmitter for emitting burst-modulated optical radiation, a receiving optical system for a part of the optical measuring radiation which is reflected by the measured object, a receiver downstream of the receiving optical system and intended for converting the optical radiation into electrical measuring signals, a device for producing reference radiation, which can be converted into electrical reference signals after passing through a known reference distance, a filter device for filtering out noise signals and a signal processing unit, in particular a digital signal processing unit, for analyzing the measuring signals and the reference signals with regard to their phase position—in order to determine therefrom the distance to the measured object and to make the result available to the user. The transmitter is connected to a frequency synthesizer, with which an intensity modulation based on the burst modulation principle can be impressed upon the emitted optical radiation. On the receiver side, the evaluation of the electrical measuring and reference signals is coupled to the active burst time.

The optical reference radiation can be produced, for example, by a beam splitter and, after passing through a known reference distance, detected by a separate reference receiver and converted into electrical reference signals. The emitted optical measuring radiation can, however, also be passed periodically either to the measured object or through the reference distance to the receiver. For example, a deflection mirror pivotable periodically into the beam path can be provided for this purpose.

For the burst modulation, a semiconductor laser diode for visible optical radiation, which has, for example, a wavelength in the range from about 630 nm to about 650 nm, can be used as a transmitter. Such semiconductor laser diodes can be operated with the required average output powers and can provide in particular the required pulse energies virtually without sacrifices in terms of lifetime.

In the method described in WO 02/16964, the electrical measuring signals are converted by continuous or burst-like superposition of a high-frequency mixer frequency into low-frequency signals and filtered only during the active burst time or converted into an output voltage by a transimpedance amplifier acting as a filter, so that the low-frequency signals can be further processed in a signal processing unit determining the distance to the measured object from the respective phase positions. The mixer frequency may correspond, for example, to the value of the modulation frequency of the burst signals±the frequency value of the low-frequency signal. The filtering out of noise can be effected, for example, on the analogue low-frequency signal and/or carried out after digitizing of the signal in the digital signal processing.

According to WO 02/16964, the active burst time is advantageously chosen as about one and a half periods of the low-frequency measuring signal. The first third of the active burst time is required in order to enable the filter to synchronize. The signal is then summed only during the following two thirds of the active burst time, which corresponds to a complete period of the low-frequency measuring signal.

However, the relatively long duration which is required for a synchronization of the filter proves to be disadvantageous since—in contrast to the actual idea of the burst modulation principle—a relatively long active burst time therefore also has to be chosen. The advantages actually achievable by the burst modulation—in particular with regard to an improvement in the signal/noise ratio (S/N)—are thus realizable only to a limited extent by the distance measuring device described in WO 02/16964.

SUMMARY

An object of the invention is therefore to provide an improved receiving circuit—in particular with regard to the signal/noise ratio—for a distance measuring device which is formed for the emission of measuring radiation modulated according to the burst modulation principle.

A further object of the invention is to provide an improved optoelectronic distance measuring method and an improved optoelectronic distance measuring device.

These objects are achieved by realizing the characterizing features of the independent claims. Features which further develop the invention in an alternative or advantageous manner are described by the dependent patent claims.

The optoelectronic distance measuring method according to the invention is based on the principle of the phase measurement of a part of measuring radiation which is reflected by a measured object. For this purpose, optical measuring radiation modulated according to the burst modulation principle is emitted in the direction of the measured object.

The measuring radiation is emitted in so-called bursts. During an active burst time in each case, which determines the width of the bursts, a modulated signal is applied so that the measuring radiation is emitted in intensity-modulated form with a certain modulation frequency. On the other hand, no modulation signal is applied during a dead time—in each case between the bursts. A burst period is defined as the duration for an active burst time and a dead time, so that the burst period gives, for example, the distance between the beginning of two successive bursts in each case.

At least a part of the emitted measuring radiation reflected by a measured object is received again and converted into an input measuring signal.

Superposition, in particular continuous superposition, with a mixer frequency is effected in such a way that the input measuring signal has substantially burst pulses of constant width, which is determined by the active burst time, and modulated amplitude. The mixer signal is modulated and superposed in such a way that a curve enveloping the burst pulses, as a low-frequency envelope curve, is approximately sinusoidal with a low envelope curve frequency in relation to the modulation frequency of the measuring radiation.

A distance to the measured object is then determined by evaluation of a measuring signal which is generated from the input measuring signal and compared for this purpose with a reference signal. In particular, the measuring signal generated is compared with regard to a phase position relative to a reference signal, it being possible for the reference signal to be generated, for example, from the detection and conversion of a measuring radiation component passed through a known reference distance.

According to the invention, on generation of the measuring signal, the measuring signal assumes in each case values dependent on the input measuring signal, during a sampling time linked to the active burst time, and the measuring signal is kept constant in each case substantially at a value which it has in each case at the end of the first period, during a holding time linked to the dead time. In particular, a so-called sample-and-hold member can be integrated for this purpose on the receiver side.

Generic sample-and-hold members are sufficiently well known from the prior art and are also designated, inter alia as sample-and-hold circuit or member (S & H) or track-and-hold circuit or member. The central element of a sample-and-hold member is usually a capacitor which performs a storage function for the incoming analogue values. For this purpose, a sample-and-hold member generally has an electronic switch for determining the sampling phase and the hold phase.

In a switched-on state, the output signal of a sample-and-hold member corresponds to the values of the input signal, while the output signal in a switched-off state remains constant at that value which the output signal has at the time of switching off. According to the invention, for example, the sample-and-hold member can be switched on in each case at the beginning of the active burst time of the received measuring radiation and switched off in each case at the beginning of a dead time of the received measuring radiation.

Depending on the bandwidth of the sample-and-hold member, the charging process of the capacitor, which is brought about by the input signal, can be designed according to the switching on of the sample-and-hold member, which, for example, also influences the response time of the sample-and-hold member. The response time is to be understood as meaning that time until the voltage at the capacitor after the sample-and-hold member has been switched on corresponds to the input voltage—within a certain tolerance. If the sample-and-hold member has, for example, a low bandwidth, the capacitor voltage determining the output signal only slightly approaches the value of the incoming burst pulse during the sampling time linked to the active burst time, whereas, in the case of very high bandwidths, the capacitor of the sample-and-hold member is completely charged to the value of the incoming burst.

Thus, the distance measuring method according to the invention does not entail filtering of the low-frequency burst pulses with the low-frequency envelope curve, which are generated by superposition of a mixer signal as input signal, only during an active burst time, undesired oscillation processes occurring on switching on the filter or transimpedance amplifier and a transient period being necessary. On the other hand, the burst-like input signal generated with superposed mixer signal can be continuously amplified by a transimpedance amplifier and subjected to low-pass filtering thereby, so that frequency components in the range of the modulation frequency which is high in relation to the low envelope curve frequency disappear and undesired oscillation processes can be avoided by filtering only during the active burst time.

Thereafter, the input signal has substantially square burst pulses with the width of the active burst time—it being possible for the burst packets to be regarded in each case approximately as being averaged over the active burst time—and with amplitudes varying approximately sinusoidally. By means of the sample-and-hold member, the values of the incoming bursts can each be held beyond the dead time, a signal-amplifying effect thus resulting. A measuring signal having—considered in rough terms—the variation of the low-frequency envelope curve is thus produced, which envelope curve can be evaluated on the basis of the phase measurement principle for determining the distance to the measured object, the measuring signal being filtered before the evaluation, preferably with a band pass filter or antialiasing filter which, for smoothing the measuring signal, gets through substantially only frequencies around the low envelope curve frequency.

In contrast to receiving circuits furthermore sufficiently well known from the prior art, a measuring signal which is generated directly from the reflected measuring radiation on reception and hence has the same frequency as the measuring radiation on the basis of a sample-and-hold member, according to the invention the direct received measuring signal of the photodiode is superposed with a suitable mixer frequency and thus generates a low-frequency burst-like input measuring signal with low-frequency envelope curve, which input measuring signal is sampled by the sample-and-hold member. According to the invention, the sampling or the sampling time is therefore linked to the burst frequency and not—as in the case of direct sampling of the photodiode signal according to the prior art—to the frequency of the measuring radiation.

Such a receiving circuit known according to the prior art is described, for example, in the publication US 2004/0135992 A1, intensity-modulated measuring radiation having a relatively low frequency of, for example, 20 MHz being used. The photodiode signal which is generated on reception of the reflected measuring radiation and has the same frequency as the modulated measuring radiation (i.e. for example 20 MHz) during the active burst time is directly sampled and evaluated, in contrast to the present invention.

BRIEF DESCRIPTION OF THE DRAWINGS

The method according to the invention and the device according to the invention are described in more detail below, purely by way of example, with reference to specific working examples shown schematically in the drawings, further advantages of the invention also being discussed. Specifically:

FIG. 6 shows an embodiment of a distance measuring device according to the invention.

DETAILED DESCRIPTION

Figure 1:
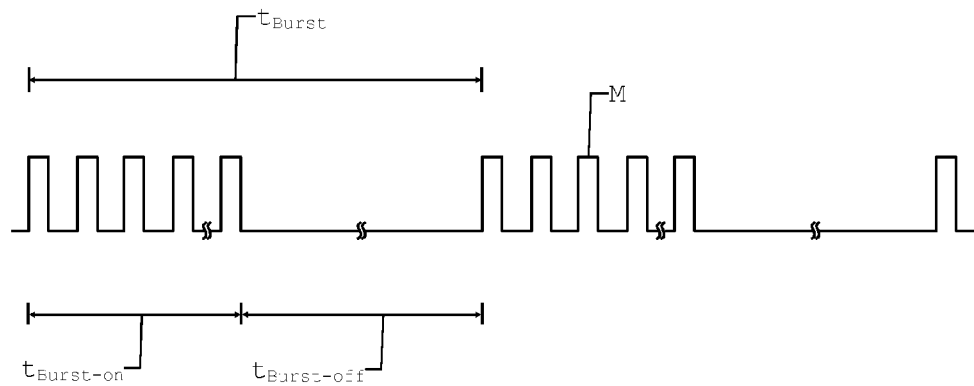
FIG. 1 shows a modulation signal diagram for generating measuring radiation modulated according to the burst modulation principle.

FIG. 1 shows a burst modulation signal diagram for illustrating the characteristics for the burst modulation of the emitted optical radiation. The duration during which the modulation signal M is present with a certain modulation frequency is designated as active burst time $t_{Burst-on}$. On the other hand, the dead time $t_{Burst-off}$ is that duration in which no modulation signal M is present. The period of an active burst time $t_{Burst-on}$ and of a dead time $t_{Burst-off}$ is designated as burst period $t_{Burst}$ with $t_{Burst}=t_{Burst-on}+t_{Burst-off}$.

The burst signal has a duty cycle which is defined as the ratio of the active burst duration $t_{Burst-on}$ to the measuring period $t_{Burst}$ in %. Consequently, the burst modulation differs from a pulse modulation in which the modulation signal is present quasi-continuously over the total duration of a measuring period. In the case of the burst modulation, on the other hand, the modulation signal M is present only during a part of the burst period $t_{Burst}$. During the active burst time $t_{Burst-on}$, a pulse sequence with pulses—in particular of about 2 ns or shorter—is emitted. FIG. 1 shows, purely by way of example, a modulation signal M with square-wave length modulation and a chosen modulation frequency—in particular higher than 100 MHz. Square-wave modulation can lead overall to a reduced peak power. However, the modulation during the active burst time $t_{Burst-on}$ can also be effected according to all pulse modulation methods known from the prior art.

The duty cycle is, inter alia, a measure of the achievable improvements in the signal/noise ratio (S/N) and can be chosen to be, for example, about 5% to about 50%, especially about 10% to about 40%.

Figure 2:
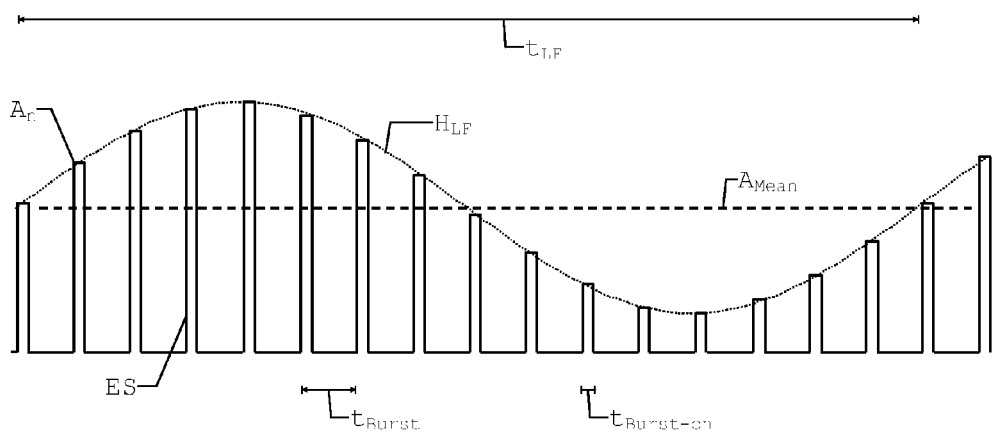
FIG. 2 shows an input measuring signal generated according to the invention by reception of a reflected part of the measuring radiation, superposition with a mixer signal taking place on reception and conversion.

FIG. 2 shows a diagram illustrating the input measuring signal ES generated according to the invention.

On reception of a part of the measuring radiation reflected by the measured object and modulated according to the burst modulation principle and on conversion into electrical signals, a superposition with a mixer signal is effected in such a way that the input measuring signal ES dependent on the received radiation has substantially burst pulses having an amplitude varying in a sinusoidal manner and constant width. The width of the burst pulses is determined by the active burst time.

A curve $H_{LF}$ enveloping burst pulses is now designated as LF envelope curve, which is substantially—i.e. approximately—sinusoidal with a low envelope curve frequency which may be in the range between 0.5 and 500 kHz.

Purely by way of example, the burst period $t_{Burst}$ and the low envelope curve frequency can be chosen for the distance measuring method according to the invention in such a way that an LF envelope curve period $t_{LF}$ determined by the low envelope curve frequency is sixteen times the burst period $t_{Burst}$ so that an LF envelope curve period therefore contains sixteen burst pulses.

Because the burst pulses are a map of the intensity of the incident measuring radiation, they also contain frequency components in the region of the modulation frequency of the measuring radiation. These components can be filtered away, for example, by means of a transimpedance amplifier providing low-pass filtering, so that the burst packets can be regarded as being averaged over the active burst time $t_{Burst-on}$. Only substantially square-wave pulses of width $t_{Burst-on}$, which have the amplitudes $A_n$, are then therefore present. According to the choice of the ratio of the LF envelope curve period $t_{LF}$ to the burst period $t_{Burst}$, described by way of example above, an LF envelope curve period then has sixteen such pulses. Their respective amplitudes $A_n$ form the interpolation nodes of the sinusoidal LF envelope curve $H_{LF}$, where $A_n$ can then be described, for example, by $A_n = A_{Mean} + A \cdot \sin(n \cdot (2\pi/16))$.

Figure 3A:
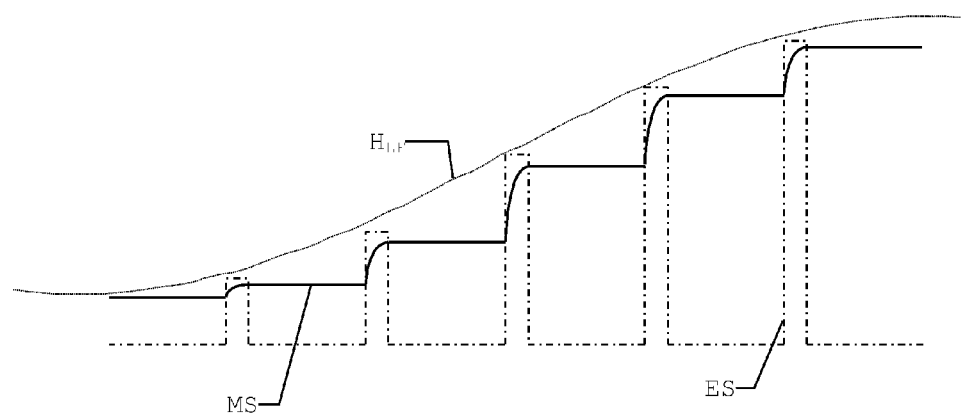
FIG. 3 shows the generated input measuring signal as a sample-and-hold member input signal and the sample-and-hold member output signal which is dependent thereon.
Figure 3B:
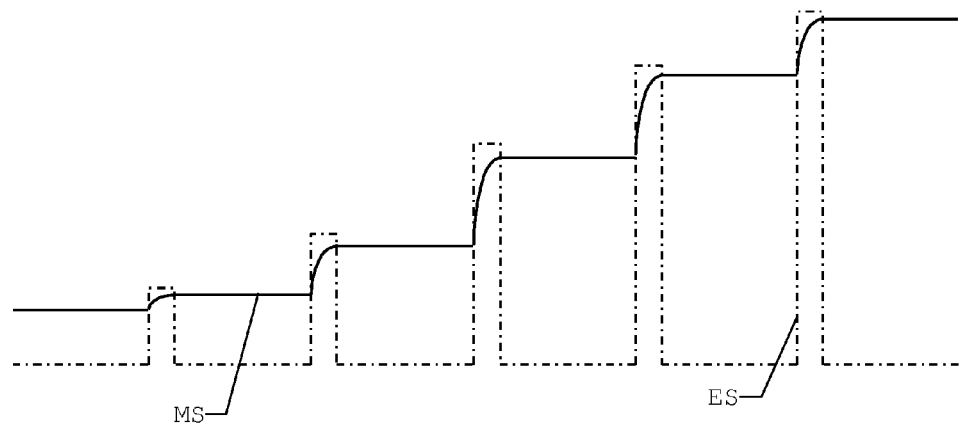

FIG. 3 shows the generated input measuring signal ES as a sample-and-hold member input signal and the sample-and-hold member output signal MS generated which is dependent thereon. The input measuring signal ES is shown in FIG. 3a with the LF envelope curve $H_{LF}$ resulting therefrom and in FIG. 3b without envelope curve.

In each case during a sampling period linked to the active burst time $t_{Burst-on}$, especially during the active burst time $t_{Burst-on}$ of the received measuring radiation, the output signal MS of the sample-and-hold member assumes values dependent on the burst pulse of the input measuring signal. In particular, owing to the charging process of a signal value storage means of the sample-and-hold member, which signal value storage means is in particular in the form of a capacitor, the output signal MS exponentially approaches the amplitude of the burst pulse. Depending on the design of the sample-and-hold member, for example depending on the choice of the bandwidth of the sample-and-hold member, the capacitor voltage determining the output signal MS only slightly approaches the value of the incoming burst pulse during the first period, i.e. during the sampling time, or the capacitor of the sample-and-hold member is completely charged to the value of the incoming burst.

In particular, the sample-and-hold member can be designed in such a way that the value of the output signal MS substantially corresponds approximately to the value of the amplitude of the burst pulse only at the end of the sampling time. Alternatively, it is also possible to design the sample-and-hold member in such a way that the value of the output signal MS is slightly below the amplitude of the burst pulse at the end of the first period.

In each case during a hold time linked to the dead time, the sample-and-hold member output signal MS is kept constant by the signal value storage means, in particular in the form of a capacitor, substantially at a value which the output signal MS has in each case at the end of the sampling time.

It should be noted that in general a hold drift which is determined in particular by a discharge current at the capacitor of the sample-and-hold member always occurs during the hold time, so that it is usually not possible to keep the value exactly constant. On the other hand, the term "keeping constant" is to be understood as meaning holding of the value within customary hold drifts.

The output signal MS of the sample-and-hold member can then be filtered by means of a band pass, which allows through only frequencies in the region of the low envelope curve frequency, and represents the measuring signal to be evaluated on the basis of the phase principle.

For example, the measuring signal can be digitized by an analogue-digital convertor and compared by means of a signal processing unit to a reference signal—for determining the distance of the measured object—with regard to a phase position.

Figure 4:
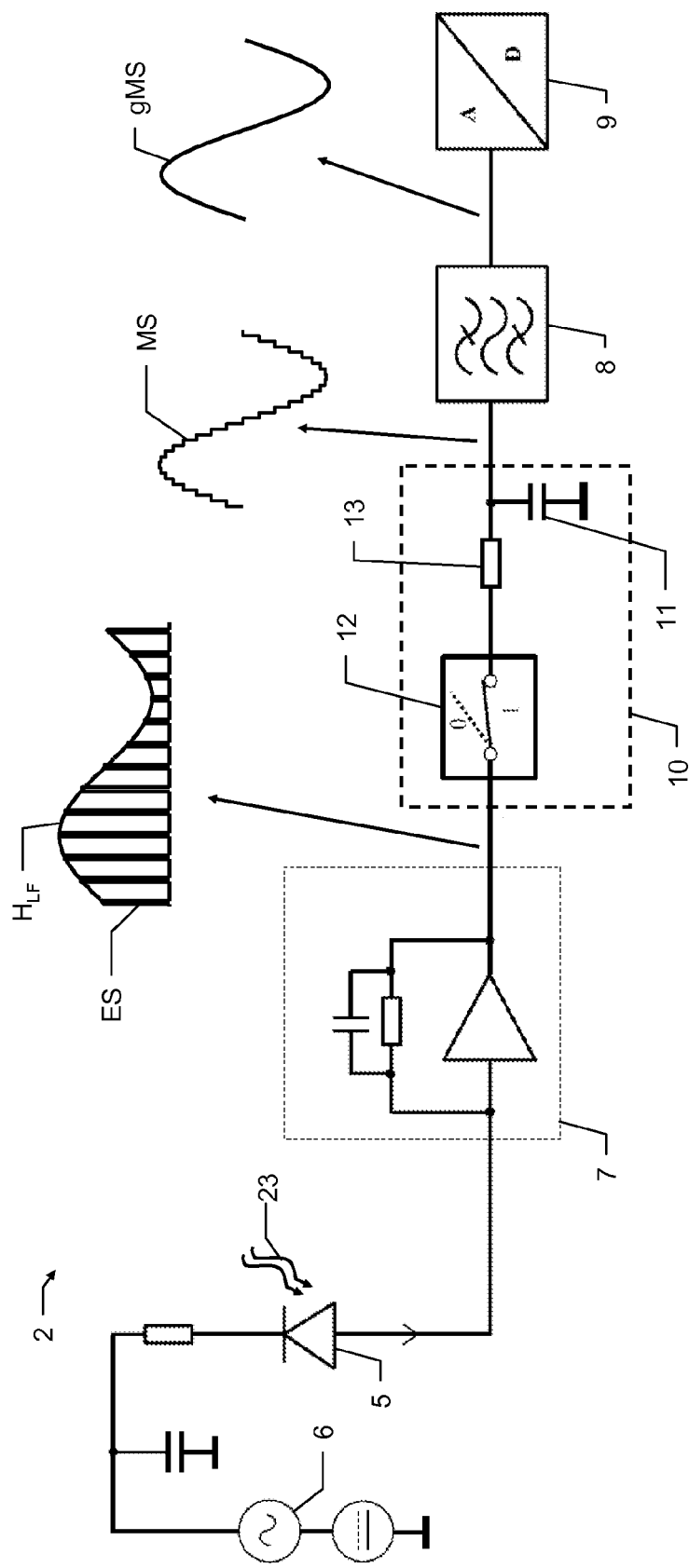
FIG. 4 shows an embodiment of a receiving circuit according to the invention for an optoelectronic distance measuring device with a sample-and-hold member.

FIG. 4 shows a receiving circuit 2 according to the invention for an optoelectronic distance measuring device which is formed for emitting measuring radiation modulated according to the burst modulation principle.

The receiving circuit 2 has a receiver 5 for converting at least a part of the measuring radiation 23 reflected by a measured object and modulated according to the burst modulation principle into an electrical input measuring signal ES. For example, an avalanche photodiode (APD), which is applied via a series resistor to a modulated bias voltage as mixer voltage, can be used as receiver 5, for which purpose the receiving circuit has corresponding means 6 for applying the modulated mixer voltage.

The mixer voltage can now be modulated in such a way that the APD current generated as a function of the received measuring radiation has, as the input measuring signal ES, substantially burst pulses of constant width, which is determined by the active burst time, and modulated amplitude and—according to FIG. 2—a curve enveloping the burst pulses varies, as LF envelope curve $H_{LF}$, substantially sinusoidally with a low envelope curve frequency.

The generated APD current as input measuring signal ES, still has frequency components in the region of the modulation frequency, which can be filtered out by a transimpedance amplifier 7 which acts as a low-pass filter, is connected between the receiver and the sample-and-hold member 10 and converts the APD current into an output voltage.

Only substantially square-wave voltage pulses of width $t_{Burst-on}$, which have sinusoidally varying amplitudes, are then therefore present.

According to the invention, the output voltage of the transimpedance amplifier 7, which represents the filtered APD input measuring signal ES, is converted by a sample-and-hold member 10 into a sample-and-hold member output voltage as measuring signal MS, where the output voltage of the transimpedance amplifier may be considered as a sample-and-hold member input voltage.

For this purpose, the sample-and-hold member 10 may have an electronic switch 12 for fixing the sampling time and the hold time, a capacitor 11 for maintaining a voltage value during the hold time and a charging resistor 13, inter alia for designing the bandwidth of the sample-and-hold member 10, which influences, for example, the response time. The voltage applied at the capacitor 11 is the sample-and-hold member output voltage, which represents the measuring signal MS to be evaluated for the determination of a distance to the measured object.

According to the invention, the sampling time of the sample-and-hold member 10 is linked to the active burst time, and the hold time is linked to the dead time of the received measuring radiation 23. In particular, the sampling time may be chosen to be equal to the active burst time, and the hold time may be chosen to be equal to the dead time. The switch 12 is then closed during the active burst times, so that the capacitor voltage is changed in each case by the incoming burst pulse, and open during the dead time. During the dead time, the capacitor voltage is therefore kept substantially constant at that voltage value which occurs at the time of opening of the switch 12.

Alternatively, however, the hold time may also be chosen somewhat longer than the dead time, and the sampling time accordingly somewhat shorter than the active burst time, so that the hold time in each case slightly overlaps with the preceding and/or the subsequent active burst time of the received measuring radiation. In this variant, the input measuring signal ES is therefore not sampled in each case during the total active burst time. Purely by way of example, for a duty cycle of 20%, the sampling time can be chosen, for example, as 0.8 times the active burst time and accordingly the hold time as 1.05 times the dead time, the hold time then slightly overlapping with the preceding and the subsequent active burst time.

The response time of the sample-and-hold member 10 can be chosen in particular to be approximately equal to or somewhat longer than the sampling time. In the first case, the capacitor 11 is then charged or discharged completely to a value of the incoming burst, for example only at the end of the sampling time, so that the capacitor voltage at the end of the sampling time corresponds approximately to the sample-and-hold member input voltage. In one design of the sample-and-hold member 10, so that the response time lasts somewhat longer than the sampling time, the capacitor 11 is in each case not charged or discharged completely to the value of the incoming bursts.

In particular, a bandpass filter 8, in particular an antialiasing filter, with passing frequencies only in the vicinity of the low envelope curve frequency is connected down-circuit of the sample-and-hold member 10, so that the sample-and-hold member output signal present as the measuring signal MS is smoothed.

The bandpass-filtered measuring signal gMS can now be digitized by an analogue-digital convertor 9. Thereafter, an evaluation of the measuring signal, for example by corresponding signal processing software, can be effected for determining the distance to the measured object.

The noise voltage occurring at the capacitor 11 of the sample-and-hold member 10 may be considered as follows: during the active burst time $t_{Burst-on}$, the switch 12 is closed and the noise has the form of the input noise filtered by a low-pass filter. After the switch 12 has been opened, the voltage remains at the last value of the active burst time. During the hold time, a constant pulse therefore occurs as noise. The height of this pulse is a random process with an expected value of zero.

Because the bandpass filter located before the analogue-digital convertor 9 allows through only the frequencies around the low envelope curve frequency, the noise power density of the process occurring during the hold time is of interest only in the vicinity of the low envelope curve frequency.

Specification or optimization of the receiving circuit 2, for example an optimum choice of the bandwidth of the sample-and-hold member 10, can be carried out by a person skilled in the art according to requirements with regard to the distance measuring device incorporating the receiving circuit 2.

Figure 5:
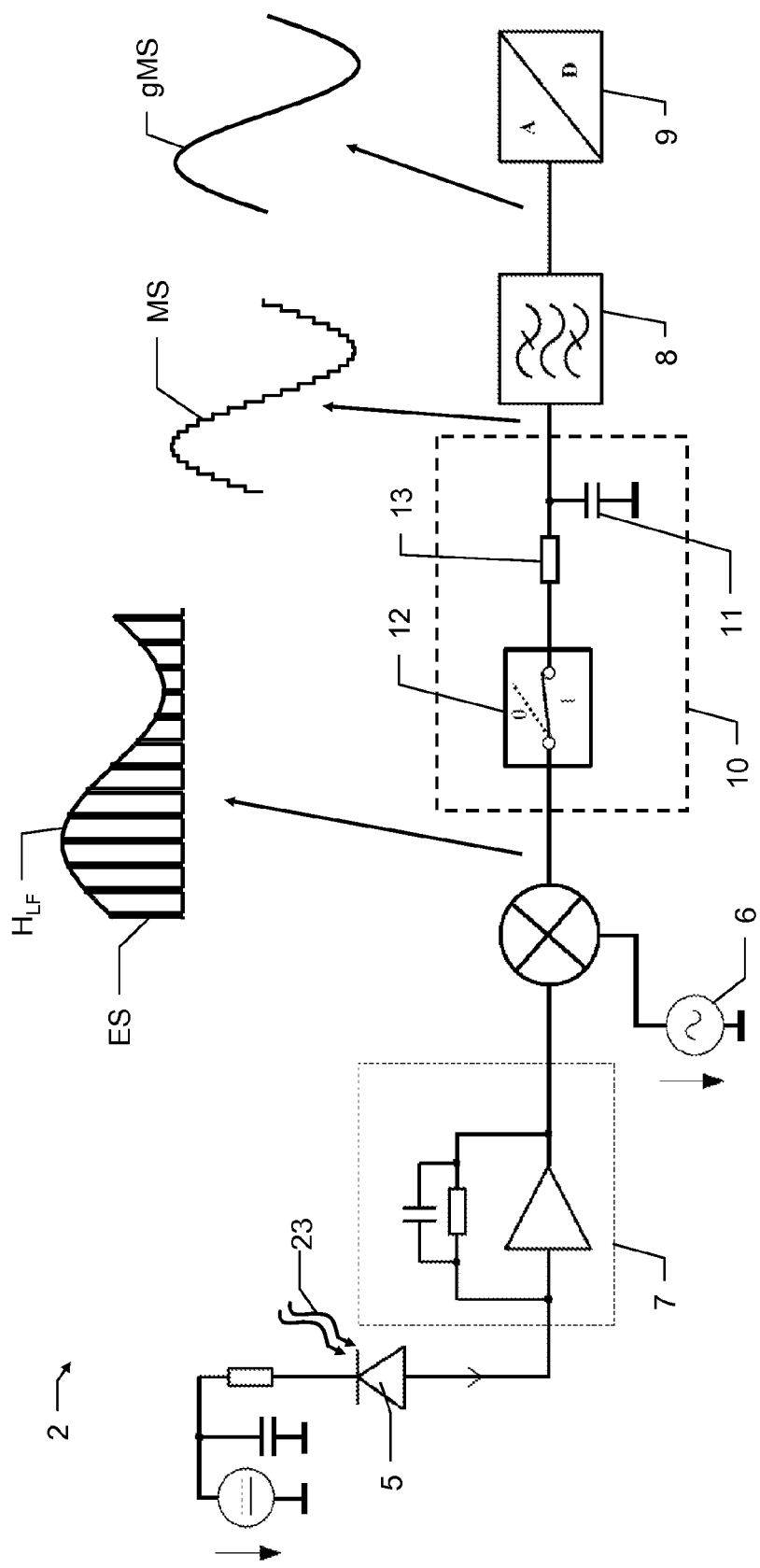
FIG. 5 shows a further embodiment of a receiving circuit according to the invention for an optoelectronic distance measuring device with a sample-and-hold member.

FIG. 5 shows a further embodiment of the receiving circuit 2 according to the invention. In contrast to the receiving circuit shown in FIG. 4, in which the superposition of the input measuring signal (ES) with the mixer frequency takes place so to speak via the diode, the receiving circuit shown in FIG. 5 has a frequency synthesizer connected after the high-frequency transimpedance amplifier 7, for modulating the burst pulse amplitudes of the input measuring signal (ES).

FIG. 6 shows an optoelectronic distance measuring device 1 according to the invention, comprising a transmitter 3 for emitting optical measuring radiation 21 modulated according to the burst modulation principle—with a burst period comprising an active burst time and a dead time—in the direction of a measured object 33. Furthermore, the distance measuring device 1 has the receiving circuit 2 shown in FIG. 4 and a signal processing unit 4 for determining a distance by evaluating the measuring signal in relation to reference signals according to the phase measurement principle.

The laser source as transmitter 3 emits optical measuring radiation 21 modulated in the form of bursts in the direction of a measured object 33 whose distance from the distance measuring device 1 is to be measured. By means of a beam splitter, a small proportion of the measuring radiation is branched off as reference radiation 22. At least a part of the measuring radiation 23 reflected by the measured object is collected by a receiving optical system and transmitted to the receiver 5 which, as described above, is connected to a modulated mixer voltage. The reference radiation 22 is passed via a deflection mirror onto a reference receiver 32. The distance covered by the reference radiation 22 from the beam splitter to the reference receiver 32 is the known reference distance.

The burst modulation of the optical measuring radiation is effected, for example, by a modulation signal which is applied to the transmitter 3 and can be generated, for example, by a frequency synthesizer 31.

The input measuring signal generated by the receiver 5 so to speak as a map of the received measuring radiation 23 is—as explained in the description of FIG. 4—converted into a measuring signal and then digitized by the receiving circuit 2. For this purpose, the receiving circuit 2 has means 6 for applying, in particular continuously, a modulated mixer voltage to the receiver 5, the receiver 5 itself, an impedance amplifier 7, according to the invention the sample-and-hold member 10, a bandpass filter 8 with passing frequencies in the region around the low envelope curve frequency and an analogue-digital converter 9.

The signal processing unit 4 now evaluates the digitized measuring signal in relation to a reference signal generated by the reference receiver 32 and determines the desired distance to the measured object therefrom.

The distance measuring device 1 according to the invention can be formed in particular as a hand-held device.

As an alternative to the embodiment shown in FIG. 6, in which a small part of the measuring radiation 23 is branched off as reference radiation 22 and a reference signal is generated therefrom, it is possible—as is known according to the prior art—also directly to use the modulation signal which is present at the transmitter 3 as a reference signal for evaluation or calibration of the measuring signal generated. For example, the modulation signal present at the transmitter 3 can be provided directly to the signal processing unit 4 as a reference signal so that the measuring signal generated according to the invention is evaluated in relation to this reference signal and the desired distance to the measured object is determined therefrom.

Of course, these figures shown schematically represent only possible working examples. For example, the sample-and-hold member can be formed according to further embodiments known from the prior art, such as, for example, integrated into the analogue-digital converter. Additionally or alternatively, a receiving circuit according to the invention, having a sample-and-hold member, can also optionally be provided for the reference receiver.

We claim:

1. An optoelectronic distance measuring method according to the phase measurement principle, comprising the steps:
   emitting optical measuring radiation in the direction of a measured object, the optical measuring radiation modulated according to the burst modulation principle with a burst period comprising an active burst time and a dead time;
   receiving at least a part of measuring radiation reflected by the measured object and converting the received measuring radiation into an input measuring signal; and
   determining a distance to the measured object by evaluation of a measuring signal generated from the input measuring signal, wherein:
      on reception and conversion, continuous superposition, with a mixer signal is effected in such a way that the input measuring signal substantially has burst pulses of constant width which is determined by the active burst time and modulated amplitude, a curve enveloping the burst pulses, as an low frequency envelope curve, varies approximately sinusoidally with a low envelope curve frequency;
      the measuring signal assumes values dependent on the input measuring signal in each case during a sampling time linked to the active burst time; and
      the measuring signal is kept substantially at a value which the measuring signal has in each case at the end of the sampling time, in each case during a hold time linked to the dead time.

2. A distance measuring method according to claim 1, wherein on reception and conversion, continuous superposition, with a mixer signal is effected in such a way that the input measuring signal substantially has burst pulses of constant width which is determined by the active burst time and modulated amplitude, a curve enveloping the burst pulses, as an low frequency envelope curve, varies approximately sinusoidally with a low envelope curve frequency.

3. A distance measuring method according to claim 1, wherein the input measuring signal is filtered by a low-pass filter so that frequency components in the frequency range around a modulation frequency with which the measuring radiation is modulated during the active burst time are blocked.

4. A distance measuring method according to claim 1, wherein the measuring signal assumes values dependent on the amplitude of the burst pulse during the sampling time.

5. A distance measuring method according to claim 4, wherein:
   during the sampling time, the measuring signal approaches the amplitude of the burst pulse exponentially.

6. A distance measuring method according to claim 4, wherein:
   during the sampling time, the measuring signal approaches the amplitude of the burst pulse exponentially in such a way that the value of the measuring signal:
      corresponds to the value of the amplitude of the burst pulse only at the end of the sampling time; or
      is slightly below the amplitude of the burst pulse at the end of the sampling time.

7. A distance measuring method according to claim 1, wherein the measuring signal is filtered before the evaluation with a bandpass filter which allows through only frequencies around the low envelope curve frequency.

8. A distance measuring method according to claim 1, wherein:
   the measuring radiation is modulated during the active burst time with a modulation frequency greater than 100 MHz; and
   the superposition with the mixer frequency is effected in such a way that the low envelope curve frequency is in the range between 0.5 and 500 kHz.

9. A distance measuring method according to claim 1, wherein the burst period and the low envelope curve frequency are chosen so that the low frequency envelope curve period is sixteen times the burst period.

10. A distance measuring method according to claim 1, wherein a duty cycle, which is defined by the ratio of the active burst time to the burst period, of 5% to 50% is achieved.

11. A distance measuring method according to claim 1, wherein a duty cycle, which is defined by the ratio of the active burst time to the burst period of 10% to 40% is achieved.

12. A distance measuring method according to claim 1, wherein the evaluation of the measuring signal with regard to a phase position is effected relative to a reference signal which is generated from the detection and conversion of a component of the measuring radiation which is passed through a known reference distance.

13. A receiving circuit for an optoelectronic distance measuring device, comprising:
   a receiver for converting at least a part of optical measuring radiation reflected by a measured object into an electrical input measuring signal, the measuring radiation being modulated according to the burst modulation principle with a burst period comprising an active burst time and a dead time;
   the receiving circuit being formed for generating a measuring signal, suitable for evaluation according to the phase measurement principle, from the input measuring signal;
   means for applying a modulated mixer voltage to the receiver so that the input measuring signal has burst pulses of constant width which is determined by the active burst time, and modulated amplitude, and a curve enveloping the burst pulses, as low frequency envelope curve, varies sinusoidally with a low envelope curve frequency; and
   a sample-and-hold member with a sampling time linked to the active burst time and a hold time linked to the dead time.

14. A receiving circuit according to claim 13, wherein the modulated mixer voltage is continuously applied to the receiver.

15. A receiving circuit according to claim 13, further comprising a bandpass filter connected down-circuit of the sample-and-hold member and having passing frequencies in a range around the low envelope curve frequency.

16. A receiving circuit according to claim 13, wherein the receiving circuit has a transimpedance amplifier which is connected between the receiver and the sample-and-hold member and is formed for low-pass filtering, so that frequency components of the input measuring signal in the frequency range around a modulation frequency with which the measuring radiation is modulated during the active burst time are blocked.

17. A receiving circuit according to claim 13, wherein a response time of the sample-and-hold member is chosen to be about equal to or longer than the sampling time.

18. A receiving circuit according to claim 13, wherein the sample-and-hold member includes:
   a switch for fixing the sampling time and the hold time;
   a capacitor for keeping a signal value constant during the hold time; and
   a charging resistor for designing the sample-and-hold member, inter alia with regard to a response time.

19. A receiving circuit according claim 13, wherein the sample-and-hold member is configured for sampling the input measuring signal which is generated by superposition with the mixer frequency and is enveloped by the low frequency envelope curve which has a low frequency in relation to the modulation frequency of the measuring radiation.

20. An optoelectronic distance measuring device, in particular in the form of a hand-held device, comprising
   a transmitter for emitting optical measuring radiation in the direction of a measured object, the optical measuring radiation being modulated according to the burst modulation principle with a burst period comprising an active burst time and a dead time;
   a receiving circuit according to claim 13; and
   a signal processing unit for determining a distance by evaluating the measuring signal according to the phase measurement principal.

21. An optoelectronic distance measuring device, in particular in the form of a hand-held device, comprising
   a transmitter for emitting optical measuring radiation in the direction of a measured object, the optical measuring radiation being modulated according to the burst modulation principle with a burst period comprising an active burst time and a dead time;
   a recieving circuit according to claim 13; and
   a signal processing unit for determining a distance by evaluating the measuring signal according to the phase measurement principle, a reference path being provided for passage of a component of the measuring radiation along a known reference distance to a reference receiver formed for generating a reference signal, and the signal processing unit evaluating the measuring signal with regard to a phase position relative to the reference signal.

* * * * *